US009261064B2

(12) United States Patent
Patel et al.

(10) Patent No.: US 9,261,064 B2
(45) Date of Patent: Feb. 16, 2016

(54) SYSTEM FOR TRANSMITTING TORQUE WITH SPEED MODULATION

(71) Applicant: Caterpillar Inc., Peoria, IL (US)

(72) Inventors: Vipulkumar Patel, Washington, IL (US); Jacob Carl Wyss, Eureka, IL (US); Krishnakumar D. Ramamoorthy, Peoria, IL (US); Dean Potts, Smithfield, IL (US)

(73) Assignee: Caterpillar Inc., Peoria, IL (US)

( * ) Notice: Subject to any disclaimer, the term of this patent is extended or adjusted under 35 U.S.C. 154(b) by 79 days.

(21) Appl. No.: 14/182,627

(22) Filed: Feb. 18, 2014

(65) Prior Publication Data

US 2015/0233448 A1 Aug. 20, 2015

(51) Int. Cl.

| | |
|---|---|
| ***F02N 15/02*** | (2006.01) |
| ***F16H 37/06*** | (2006.01) |
| ***F02N 11/04*** | (2006.01) |
| ***F02N 15/04*** | (2006.01) |

(52) U.S. Cl.

CPC .............. *F02N 11/04* (2013.01); *F02N 15/023* (2013.01); *F02N 15/043* (2013.01); *Y10T 74/19177* (2015.01)

(58) Field of Classification Search

CPC ........ B60K 6/48; F02N 15/043; F02N 15/023
USPC ..................................... 74/6, 7 E, 661, 665 B
See application file for complete search history.

(56) References Cited

U.S. PATENT DOCUMENTS

| | | | | |
|---|---|---|---|---|
| 1,255,369 | A | 2/1918 | Weydell | |
| 2,466,461 | A | 4/1949 | Mauric et al. | |
| 2,487,460 | A | 11/1949 | Mauric | |
| 2,553,202 | A | 5/1951 | Metsger | |
| 2,887,100 | A | 5/1959 | Papst | |
| 4,743,776 | A * | 5/1988 | Baehler | F02N 11/04 290/22 |
| 4,862,009 | A | 8/1989 | King | |

(Continued)

FOREIGN PATENT DOCUMENTS

| | | |
|---|---|---|
| GB | 430044 | 6/1935 |
| JP | 07-259710 A | 10/1995 |

(Continued)

*Primary Examiner* — Ha D Ho
(74) *Attorney, Agent, or Firm* — William R. Tinker

(57) ABSTRACT

A system is provided for transmitting torque with speed modulation between a motor generator and an engine. The system includes a first shaft, a second shaft, a first reduction gearset, and a second reduction gearset. The first shaft is configured to rotatably connect with the motor generator. The second shaft is configured to rotatably connect with the engine. The first reduction gearset is rotatably supported at least in part on the first shaft. The first reduction gearset is disposed in selective engagement with the first shaft via a first overrunning clutch disposed therebetween. The second reduction gearset is rotatably supported at least in part on the first shaft and at least in part on the second shaft. The second reduction gearset is disposed in selective engagement with the first shaft via a second overrunning clutch disposed therebetween.

18 Claims, 10 Drawing Sheets

(56) References Cited

U.S. PATENT DOCUMENTS

| | | | | |
|---|---|---|---|---|
| 5,126,582 | A | 6/1992 | Sugiyama | |
| 5,132,604 | A | 7/1992 | Shimane et al. | |
| 5,751,070 | A | 5/1998 | Nagao et al. | |
| 6,746,354 | B1 | 6/2004 | Ziemer | |
| 6,832,970 | B2 | 12/2004 | Eibler | |
| 7,114,585 | B2 * | 10/2006 | Man ....................... | B60K 6/365 180/65.21 |
| 7,370,716 | B2 | 5/2008 | Hickam | |
| 8,813,587 | B2 * | 8/2014 | Van Druten ............... | F02N 5/04 123/179.25 |
| 9,074,656 | B2 * | 7/2015 | Benz ....................... | F02B 67/06 |
| 2009/0322088 | A1 | 12/2009 | Dooley | |

FOREIGN PATENT DOCUMENTS

| | | | |
|---|---|---|---|
| JP | 2004-143993 | A | 5/2004 |
| JP | 2004-190854 | A | 7/2004 |
| JP | 2006335222 | | 12/2006 |

* cited by examiner

SYSTEM FOR TRANSMITTING TORQUE WITH SPEED MODULATION

TECHNICAL FIELD

The present disclosure relates to a system for transmitting torque, and more particularly to a system for transmitting torque with speed modulation between a motor generator and an engine.

BACKGROUND

Conventional systems employed for starting of an engine by a motor generator may include, for example, a Bendix drive or some planetary gear drives disposed therebetween. These systems may modulate torque and/or speed during transmission of power between the engine and the motor generator.

A large torque may typically be required to crank the engine and accomplish starting thereof. Once the engine is up and running, the motor generator may be configured to generate power. During this power generation phase, it may be helpful to keep the speed of the motor generator at an optimum level, and some previously known systems may be configured to modulate torque and/or speed depending on the operating modes. These previously known systems may be characterized by a variety of limitations and disadvantages. For example, many starter generator systems may be unable provide adequate electricity production/torque capabilities. In addition, many known systems may include costly and complex components which may be unreliable and susceptible to failure. Furthermore, many known starter generator systems and the components associated therewith may lack compactness and versatility in terms of mountings and connections to other components.

GB430044A discloses a power-transmission mechanism applicable for a turning-gear of an engine. The power transmission mechanism includes two linearly aligned shafts. One of the linearly aligned shafts may be that of a dynamo-electric machine and the other may be coupled to an engine shaft directly or through the camshaft or timing gear. The shafts are automatically coupled either directly or through reduction gearing according as one or other shaft is the driving shaft via a floating clutch ring slidably splined on the engine shaft has oppositely facing radial ratchet teeth on its lateral surfaces, for engagement respectively with corresponding teeth on a disc integral with a pinion mounted directly on the dynamo-electric machine shaft, and on a gear wheel connected to the dynamo-electric machine shaft through gearing. The dynamoelectric machine can be used as a motor to drive the engine through the reduction gearing for starting purposes and is then driven directly at engine speed as a generator wherein when the dynamo-electric machine shaft is the driver, the ring is forced by the inclined faces of the ratchet teeth into engagement with the clutch teeth of the gear, and when the engine starts and the engine shaft drives, the ring is forced into engagement with the teeth on the pinion. The present disclosure is directed to mitigating or eliminating one or more of the drawbacks discussed above.

SUMMARY

In one aspect, the present disclosure provides a system for transmitting torque with speed modulation between a motor generator and an engine. The system includes a first shaft, a second shaft, a first reduction gearset, and a second reduction gearset. The first shaft is configured to rotatably connect with the motor generator. The second shaft is configured to rotatably connect with the engine. The first reduction gearset is rotatably supported at least in part on the first shaft. The first reduction gearset is disposed in selective engagement with the first shaft via a first overrunning clutch disposed therebetween. The second reduction gearset is rotatably supported at least in part on the first shaft and at least in part on the second shaft. The second reduction gearset is disposed in selective engagement with the first shaft via a second overrunning clutch disposed therebetween.

In another aspect, the present disclosure provides a system for transmitting torque with speed modulation between a motor generator and an engine. The system includes a first shaft, a second shaft, a first reduction gearset, and a second reduction gearset. The first shaft is configured to rotatably connect with the motor generator. The second shaft is configured to rotatably connect with the engine. The first reduction gearset is rotatably supported at least in part on the first shaft. The first reduction gearset is disposed in selective engagement with the first shaft via a first overrunning clutch disposed therebetween. The second reduction gearset is rotatably supported at least in part on the first shaft and at least in part on the second shaft. The second reduction gearset is disposed in selective engagement with the first shaft via a second overrunning clutch disposed therebetween. When the first overrunning clutch is engaged and the second overrunning clutch is disengaged, the first shaft is operable to transmit torque to the second shaft via the first and second reduction gearsets in tandem. When the first overrunning clutch is disengaged and the second overrunning clutch is engaged, the second shaft is operable to transmit torque to the first shaft via the second reduction gearset.

In another aspect, the present disclosure provides a method of transmitting torque with speed modulation between a motor generator and an engine. The method includes rotatably connecting a first shaft with the motor generator. The method further includes rotatably supporting a first reduction gearset and a second reduction gearset at least in part on the first shaft. The method further includes rotatably connecting a second shaft with the engine. The method further includes rotatably supporting the second reduction gearset at least in part on the second shaft. The method further includes selectively engaging and disengaging the first reduction gearset and the second reduction gearset with the first shaft while transmitting torque between the first shaft and the second shaft.

Other features and aspects of this disclosure will be apparent from the following description and the accompanying drawings.

DETAILED DESCRIPTION

Figure 1:
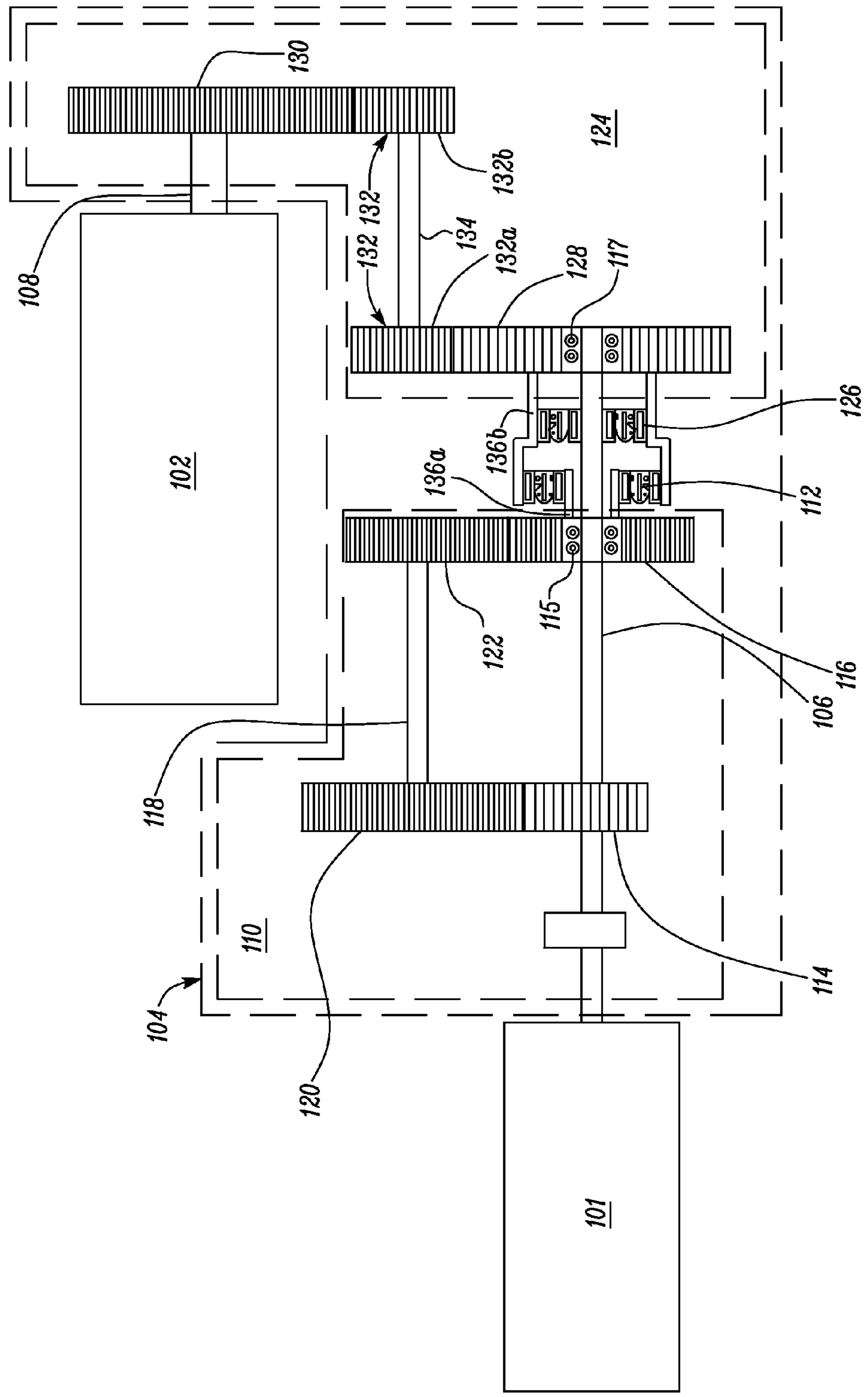
FIG. 1 is a diagrammatic representation of an exemplary motor generator and an exemplary engine employing a system of the present disclosure.

The present disclosure relates to a system for transmitting torque with speed modulation between a motor generator and an engine. Wherever possible the same reference numbers will be used throughout the drawings to refer to same or like parts. FIG. 1 shows a diagrammatic representation of an exemplary motor generator 101 and an exemplary engine 102 employing the system 104 of the present disclosure. In one embodiment, the engine 102 can be a reciprocating engine 102 to which disclosed embodiments can be implemented. However, it is to be noted that a type of engine disclosed herein is not limited to the reciprocating type, but may extend to include other types of engines commonly known in the art. For example, the engine 102 can alternatively embody a rotary engine. Additionally, the engine 102, disclosed herein, can be configured to operate on any type of fuel, for example, but not limited to, gasoline, diesel, gas, bio-fuels, mixed-fuels or other types of fuels commonly known in the art.

The exemplary motor generator 101 depicted in FIG. 1 can be configured to co-operate with the engine 102 to execute various operational modes of the engine 102 and/or the motor generator 101, explanation to which will be made later in this document. Operational modes, disclosed herein, may include starting, coasting, or regenerative braking, but is not limited thereto.

The system 104 includes a first shaft 106, a second shaft 108. The first shaft 106 can be configured to rotatably connect with the motor generator 101. The second shaft 108 can be configured to rotatably connect with the engine 102. In one embodiment, the first shaft 106 which can be connected to rotatably transmit mechanical energy between the system 104 and the motor generator 101 can be spaced in parallel offset relation with respect to the second shaft 108 which can be connected to rotatably transmit mechanical energy between the system 104 and the engine 102. Additionally, in one embodiment, the second shaft 108 can be connected to a starting gear (not shown) of the engine 102. For example, the starting gear may be a gear connected to the flywheel of the engine 102. In another example, the starting gear may be a gear disposed on the camshaft of the engine. Accordingly, the second shaft 108 can be connected to the starting gear of the flywheel or the camshaft (not shown) of the engine 102. However, it is to be noted that a location or operating part of the engine 102 to which the second shaft 108 of the present system 104 is connected may vary depending on design constraints and/or specific requirements of an application.

The system 104 further includes a first reduction gearset 110 rotatably supported at least in part on the first shaft 106. The first reduction gearset 110 is disposed in selective engagement with a second reduction gearset 124 via a first overrunning clutch 112 disposed therebetween. In an embodiment as shown, the first reduction gearset 110 can include a first gear 114 and a second gear 116 rotatably supported on the first shaft 106. The first gear 114 can be fixedly and rotatably coupled to the first shaft 106 to rotate in unison therewith, and the second gear 116 can be rotatably mounted on first shaft 106 to rotate independently of the first shaft 106 via bearings 115. Further, the first reduction gearset 110 can include an intermediate shaft 118 parallelly offset from the first shaft 106, a first reduction gear 120, and a second reduction gear 122. The first reduction gear 120 and the second reduction gear 122 are fixedly and rotatably attached to the intermediate shaft 118 such that the first reduction gear 120, the second reduction gear 122, and the intermediate shaft 118 can rotate in unison. The first reduction gear 120 is disposed in intermeshing rotatable engagement with the first gear 114. The second reduction gear 122 is disposed in intermeshing rotatable engagement with the second gear 116.

In an embodiment as shown in FIG. 1, the first gear 114, the second gear 116, the first reduction gear 120, and the second reduction gear 122 can be spur gears i.e. gears with straight-cut teeth thereon. Optionally, the first gear 114, the second gear 116, the first reduction gear 120, and the second reduction gear 122 can be helical gears i.e. gears with helically cut teeth defined thereon. The configuration and/or type of teeth on the first gear 114, the second gear 116, the first reduction gear 120, and the second reduction gear 122 can be selected based on various power-capacity and/or load-handling and noise reduction characteristics desired in the system 104.

With continued reference to FIG. 1, the system 104 further includes a second reduction gearset 124. The second reduction gearset 124 is positioned and connected to rotatably transmit mechanical energy between the second shaft 108 and one or more of the first shaft 106 and the first reduction gearset 110. The second reduction gearset 124 is disposed in selective engagement with the first reduction gearset 110 and the first shaft 106 via the first overrunning clutch 112 and a second overrunning clutch 126, respectively, wherein the first overrunning clutch 112 and the second overrunning clutch 126 are disposed between the first reduction gearset 110 and the second reduction gearset 124. In an embodiment as shown in FIG. 1, the second reduction gearset 124 includes a third gear 128, and a fourth gear 130. The third gear 128 is rotatably supported on the first shaft 106 to rotate independently of first shaft 106 via bearing 117, wherein the third gear 128 is disposed in selective engagement with the first shaft 106 via the second overrunning clutch 126. The fourth gear 130 is rigidly supported on the second shaft 108. The second reduction gearset 124 further includes an idler gearset 132 located between the third gear 128 and the fourth gear 130. The idler gearset 132 is disposed in intermeshing rotatable engagement with the third gear 128 and the fourth gear 130. Two idler gears 132*a*, 132*b* are shown in mesh with the third gear 128 and the fourth gear 130 respectively (hereinafter referred to as the first idler gear 132*a* and the second idler gear 132*b*). The two idler gears 132*a*, 132*b* can be attached to rotate in unison such as, for example, via a shaft 134 as shown in the embodiment of FIG. 1.

The first and second overrunning clutches 112, 126, disclosed herein, are of a one-way freewheeling type. As illustrated in the exemplary embodiment of FIG. 1 the first and second overrunning clutches 112, 126, are shown as sprag clutches, however in other embodiments the first and second overrunning clutches 112, 126 can be ratchet and pawl type clutches or any other type of over running clutch consistent with the present disclosure. In the disclosed embodiment, the first and second overrunning clutches 112, 126 are positioned and configured to selectively engage and disengage the rotatable connection and the transmission of rotational mechanical energy between independently rotatable components in response to disparities in relative rotational speed therebetween. In particular, the first and second overrunning clutches 112, 126 can each be positioned between independently rotatable components and configured to be selectively actuated and engaged to control and direct the path and transmission of rotational mechanical energy through the system 104 based upon the one of the second gear 116 of the first reduction gearset 110 and the third gear 128 of the second reduction gearset 124 having the higher rotational speed, which can be based, in part, on the disparities in rotational speed between the first shaft 106 and the second shaft 108. The first shaft 106 transmits rotational energy through the first reduction gearset 110 to define the speed of the second gear 116 thereof and the rotational energy from the second shaft 108 through the second reduction gearset 124 to define the speed of the third gear 128 thereof. As such, one of the first shaft 106 and the second shaft 108 can be defined as the driving component and the other of the first shaft 106 and the second shaft 108 can be defined as the driven component depending upon the differences in the degree to which the first shaft 106 transmits rotational energy through the first reduction gearset 110 to define the speed of the second gear 116 thereof and the degree to which the second shaft 108 transmits rotational energy through the second reduction gearset 124 to define the speed of the third gear 128 thereof depending on the operating mode of the engine 102 and/or the motor generator 101. During startup of the engine 102, the first shaft 106 (connected with the motor generator 101) can be construed as the driving component while the second shaft 108 (connected to the engine 102 in the stalled state) is the driven component. However, once the engine 102 is up and running, the second shaft 108 can be construed as the driver component while the first shaft 106 becomes the driven component.

Detailed explanation to a manner of operation of the first and second overrunning clutches 112, 126 will be made hereinafter.

With reference to FIG. 1, in an exemplary embodiment, a pair of interconnecting elements 136*a*, 136*b* (also referred to herein as carrier 136*a* and 136*b*) extend from the second gear 116 and the third gear 128. The interconnecting members 136*a* and 136*b* may be rigidly connected to the second gear 116 and the third gear 128 respectively. Further, as seen from FIG. 1, the interconnecting members 136*a* and 136*b* can be used to mount the first overrunning clutch 112 and the second overrunning clutch 126 respectively. Specifically, the first overrunning clutch 112 is mounted between the interconnecting element 136*a* and the interconnecting element 136*b*, while the second overrunning clutch 126 is located between the interconnecting element 136*b* and the first shaft 106.

In particular, as shown in FIG. 1, the first overrunning clutch 112 is rotatably disposed between carrier 136*b* and carrier 136*a* to selectively and rotatably connect the second gear 116 of the first reduction gearset 110 and the third gear 128 of the second reduction gearset 124 as well as allow the selective transmission of rotatable motion therebetween. As further shown in the exemplary embodiment of FIG. 1, the second overrunning clutch 126 is rotatably disposed between carrier 136*b* and first shaft 106 to selectively and rotatably connect the shaft 106 with the third gear 128 of the second reduction gearset 124 and allow the selective transmission of rotatable motion therebetween. Additionally, the first overrunning clutch 112 and the second overrunning clutch 126 are disposed coaxially in series and are both connected to an interior of carrier 136*b* wherein the second overrunning clutch 126 is disposed on the first shaft 106 adjacent to the third gear 128 and wherein the first overrunning clutch 112 is disposed between the second overrunning clutch 126 and the second gear 116. Although a schematic representation of the interconnecting elements 136*a*, 136*b* is depicted in FIG. 1, it is to be noted that the schematic representation of the interconnecting elements 136*a*, 136*b* is merely exemplary in nature and hence, non-limiting of this disclosure. The schematic representation of FIG. 1 is rendered for better clarity and to aid the reader's understanding of the present disclosure. However, any structure or method can be suitably employed to co-locate the first and second overrunning clutches 112, 126 with the first shaft 106, the first reduction gearset 110, and the second reduction gearset 124.

In a first mode of operation, the first overrunning clutch 112 engages when the second gear 116 (as rotated by first shaft 106 via first gear 114, first reduction gear 120, and second reduction gear 122) rotates faster than the third gear 128 (i.e. speed of the interconnecting element 136*a* is greater than a speed of the interconnecting element 136*b*). Therefore, engagement of the first overrunning clutch 112 engages the first reduction gearset 110 to the second reduction gearset 124 via interconnecting elements 136*a*, 136*b* located between the second gear 116 and the third gear 128. Moreover, the second overrunning clutch 126 simultaneously disengages with engagement of the first overrunning clutch 112 when the first shaft 106 rotates faster than the third gear 128 and the interconnecting element 136*b*. This disengagement of the second overrunning clutch 126 renders the third gear 128 in the freewheeling mode with respect to the first shaft 106 i.e. the second reduction gearset 124 is rendered free from direct torque of the first shaft 106.

Thereafter, the first shaft 106 is operable to transmit torque to the second shaft 108 via the first and second reduction gearsets 110, 124 in tandem. The engagement and disengagement, of the first overrunning clutch 112 and the second overrunning clutch 126 respectively, allows torque from the motor generator 101 to be routed via the first shaft 106, the first reduction gearset 110, and the second reduction gearset 124 before being transmitted to the engine 102. In this mode of operation, the torque at the second shaft 108 i.e. torque transmitted to the engine 102 is greater than the torque at the first shaft 106. Therefore, the first mode of operation, as disclosed herein, can be beneficially implemented by the system 104 during startup of the engine 102 by the motor generator 101.

It is to be noted that the engagement and disengagement of the first overrunning clutch 112 and the second overrunning clutch 126, disclosed from the first mode of operation, occur simultaneously or at least in a substantially concurrent manner i.e. with minimum overlap in time duration. Further, the first overrunning clutch 112 and the second overrunning clutch 126 continue to remain in their engaged and disengaged state respectively until the speed of the third gear 128 remains less than a speed of the first shaft 106 (i.e. speed of the motor generator 101) and a speed of the second gear 112. As evident to one skilled in the art, the speed of the third gear 128 in this mode of operation can increase with increasing speeds of the second shaft 108 (engine crankshaft speed) and the shaft 134 before the engine 102 has initialized or started.

In a second mode of operation, the first overrunning clutch 112 disengages when the third gear 128 (as rotated by engine crankshaft via second shaft 108, second idler gear 132*b*, and first idler gear 132*a*) rotates faster than the second gear 116 (i.e. speed of interconnecting element 136*b* is now greater than a speed of interconnecting element 136*a*). Disengagement of the first overrunning clutch 112 renders the first reduction gearset 110 to be in the freewheeling mode with respect to the second reduction gearset 124 i.e. the interconnecting element 136*a* and hence, the first reduction gearset 110 will no longer receive torque directly from the interconnecting element 136 and the second reduction gearset 124. Moreover, the second overrunning clutch 126 simultaneously engages with disengagement of the first overrunning clutch 112 when the third gear 128 rotates faster (from the increased speed of the second shaft 108 and the engine crankshaft) than the first shaft 106. This engagement of the second overrunning clutch 126 engages the second reduction gearset 124 to the first shaft 106 via interconnecting element **136*b*** located therebetween.

Thereafter, the second shaft 108 is operable to transmit torque to the first shaft 106 via the second reduction gearset 124 alone. The engagement and disengagement, of the second overrunning clutch 126 and the first overrunning clutch 112 respectively, allows torque from the engine 102 to be routed via the second reduction gearset 124, and the first shaft 106 before being transmitted to the motor generator 101. In this mode of operation, a rotational speed of the first shaft 106 is increased when the first overrunning clutch 112 disengages and the second overrunning clutch 126 engages. Therefore, this mode of operation can be beneficially implemented by the system 104 during a power generation mode at the motor generator 101 after the engine 102 has initialized or started. However, the rotational speed of the first shaft 106 may be beneficially increased in a range of about 1.1 to 3.5 times that of a rotational speed of the first shaft 106 during startup (i.e. from first mode of operation of the system 104).

With continued reference to FIG. 1, it is to be noted that the engagement and disengagement of the second overrunning clutch 126 and the first overrunning clutch 112, disclosed from the second mode of operation, occur simultaneously or at least in a substantially concurrent manner i.e. with minimum overlap in time duration. Further, the second overrunning clutch 126 and the first overrunning clutch 112 continue to remain in their engaged and disengaged state respectively until the speed of the third gear 128 remains more than a speed of the first shaft 106 (i.e. speed of the motor generator 101) and a speed of the second gear 112. As evident to one skilled in the art, the speed of the third gear 128 in this mode of operation can increase with increasing speeds of the second shaft 108 (engine crankshaft speed) and the shaft 134 after the engine 102 has initialized or started.

It is envisioned by way of the present disclosure that in the second mode of operation by the system 104, the engagement of the second overrunning clutch 126 and the disengagement of the first overrunning clutch 112 can be helpful in preventing the motor generator 101 from running at a very large speed due to speed amplification from the first and second reduction gearsets 110, 124. Rather, only the second overrunning clutch 126 engages the second reduction gearset 124 to the first shaft 106 and hence, amplification in the speed of the first shaft 106 is effected by the gear ratios of the second reduction gearset 124 alone. Thus, the speed of the first shaft 106 marginally increases from that during startup of the engine 102 (i.e. when the system 104 was executing the first mode of operation disclosed herein).

In an example, if the first gear 114, the first reduction gear, the second reduction gear, and the second gear 116 of the first reduction gearset 110 have 25 teeth, 60 teeth, 18 teeth, and 67 teeth respectively, and similarly, if the third gear 128, the first idler gear **132*a*, the second idler gear 132*b*, and the fourth gear 130 of the second reduction gearset 124 have 70 teeth, 22 teeth, 22 teeth, and 126 teeth respectively, then the effective torque amplification in the first mode of operation may be given by $G1=((60\div25)\times(67\div18)\times(126\div70))=16.08$ (i.e. effective gear reduction in the first mode of operation is approximately 1:16). However, the effective speed amplification or increase in speed of the first shaft 106 during the second mode of operation by the system 104 may be given by $G2=(126\div70)=1.8$ (i.e. effective gear reduction in the first mode of operation is 1:1.8). Therefore, with reference to the preceding example, during engine startup, the system 104 can be in the first mode of operation and can apply a large torque from the motor generator 101 (16 times that of the motor generator 101) to the starting gear, flywheel, or camshaft of the engine 102. However, during power generation at the motor generator 101, the system 104 can be in the second mode of operation and can increase the speed of the first shaft 106 by 1.8 times (as compared to a rotational speed of the first shaft 106 during startup of the engine 102**).

With reference to the present disclosure, the speed of the first shaft 106 during power generation may be increased in order to achieve maximum and/or optimum power output from the motor generator 101. Although, the preceding example discloses a 1.8 times increase in the speed of the first shaft 106 (as compared to a rotational speed of the first shaft 106 during startup of the engine 102), the increase in speed can be varied by varying the gear ratio between the third and fourth gears 128, 130. However, it is envisioned to beneficially keep the increase in speed of the first shaft 106 within a certain limit to avoid running the motor generator 101 at very high rpm (revolutions per minute). Therefore, in various embodiments of the present disclosure, the increase in rotational speed of the first shaft 106 during the second mode of operation may be kept at about 1.1 to 3.5 times that of the rotational speed of the first shaft 106 in the first mode of operation.

With continued reference to FIG. 1, it can be seen that the second shaft 108 is disposed in parallel relation to the first shaft 106. Although a parallel configuration of the second shaft 108 and the first shaft 106 is depicted in the embodiment of FIG. 1, the first shaft 106 can be oriented into any angular position with respect to the shaft 134 depending on space constraints and/or relative positions of the engine 102 and the motor generator 101. Optionally, the locations of the second shaft 108 and the shaft 134 can be fixed; however, the intermediate shaft 118 can be rotated around the first shaft 106. For purposes of better understanding of the present disclosure, explanation pertaining to the different embodiments of parallel configuration will be made herein in conjunction with FIGS. 3-9.

Figure 2:
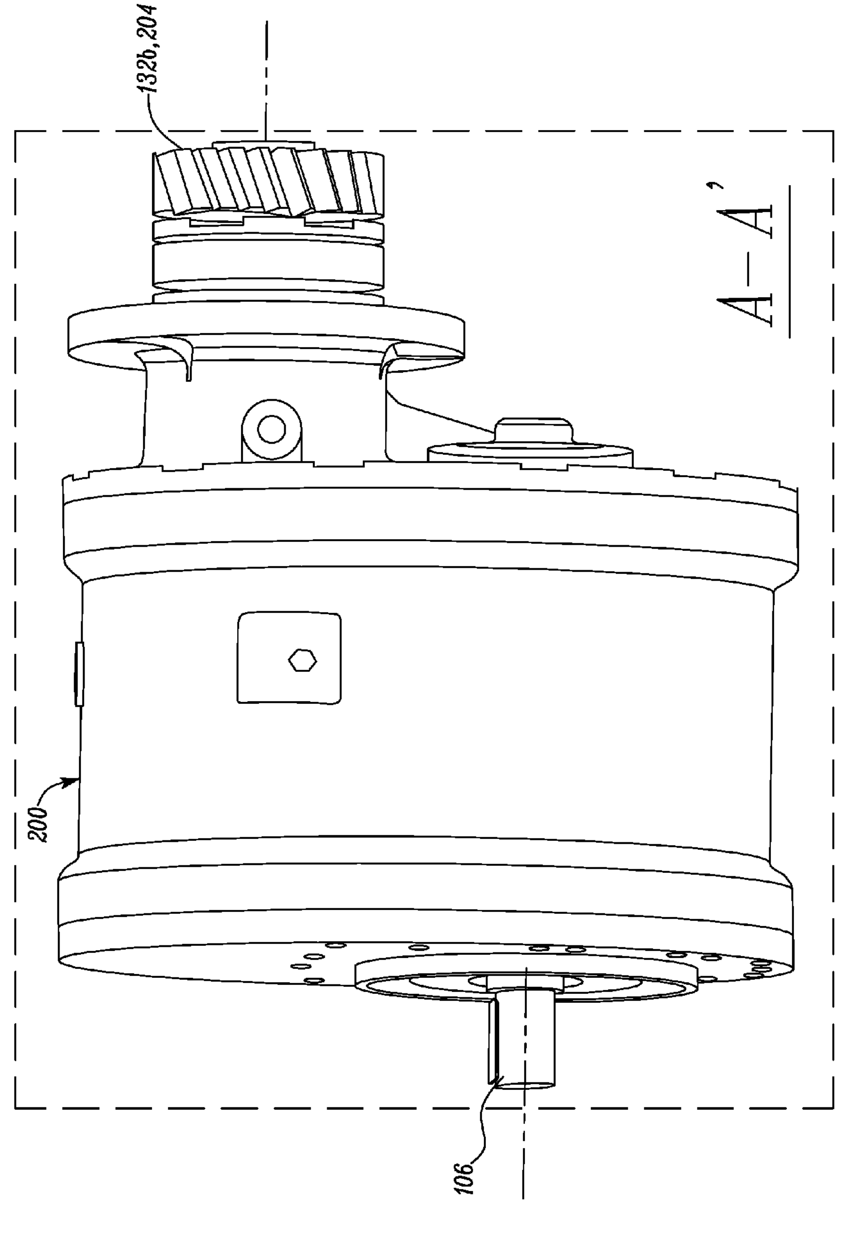
FIG. 2 is an exemplary perspective view of the system in accordance with an embodiment of the present disclosure.
Figure 3:
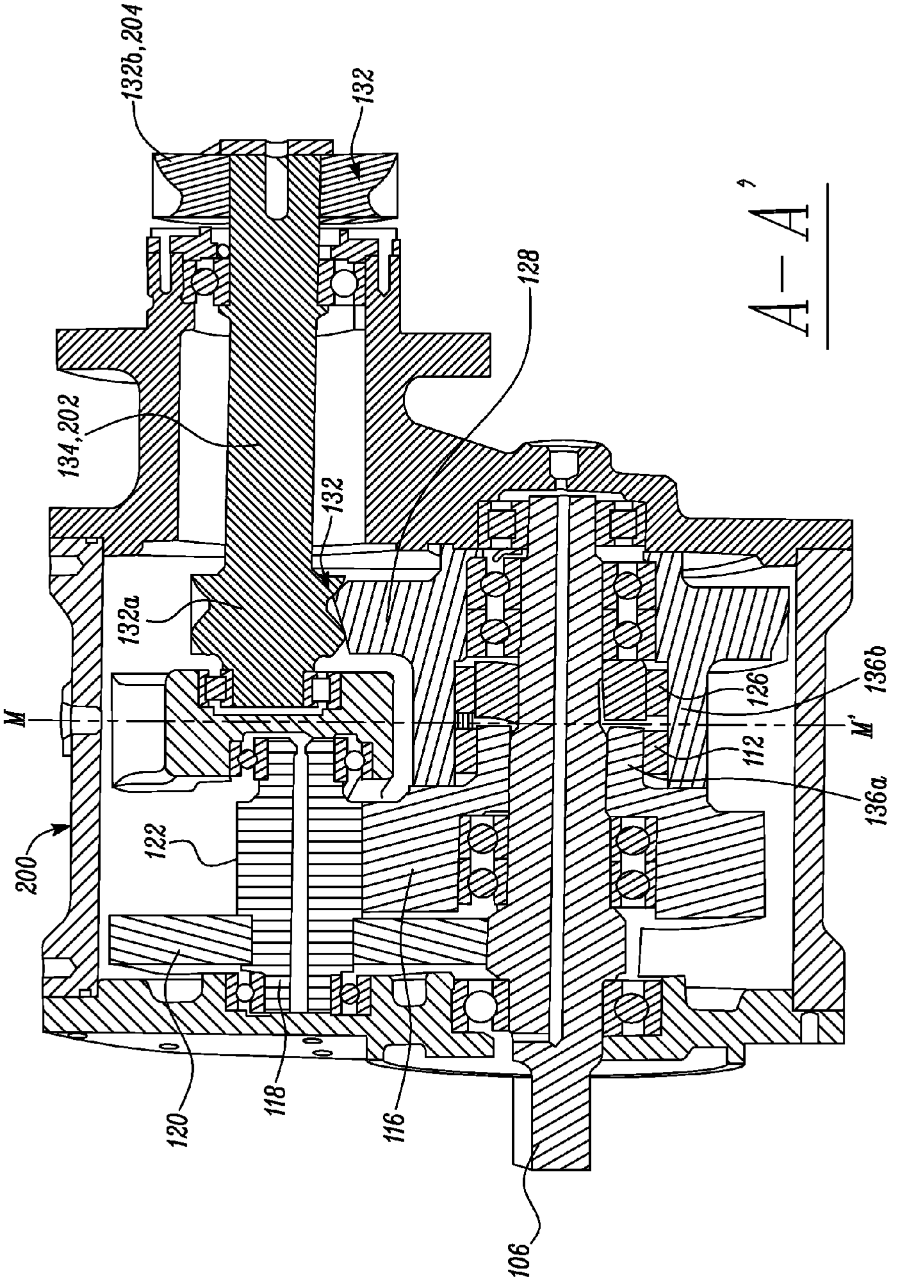
FIG. 3 is a sectional view of the system depicted in FIG. 2.

Referring now to FIG. 2, a physical form of the system 104 is exemplarily rendered in perspective view in accordance with an embodiment of the present disclosure. FIG. 3 correspondingly illustrates a sectional view of the system 104 of FIG. 2. As shown in FIGS. 2 and 3, the system 104 includes a housing 200 preferably made of a sturdy material such as, but not limited to, cast iron, steel, or other materials commonly known in the art. The housing 200 may define an internal hollow space to accommodate the first shaft 106, the second shaft 108, the intermediate shaft 118, the shaft 134, the first reduction gearset 110, and the second reduction gearset 124 therein. Further, the housing 200 can include one or more internal cavities, recesses, and/or pockets (blind or through) to rotatably and/or rigidly support the first shaft 106, the second shaft 108, the intermediate shaft 118, the shaft 134, the first reduction gearset 110, and the second reduction gearset 124. Moreover, as shown in the specific embodiment of FIG. 2, the first shaft 106 and the second shaft 108 may lie in a common plane A-A' along which the sectional view of FIG. 3 is rendered.

Referring to FIGS. 2-3, the second idler gear **132*b* is shown disposed outwards of the housing 200 and hence, the second idler gear 132*b* can be configured to readily connect with a starting gear, ring gear, flywheel, crankshaft, camshaft or other appropriate location of the engine 102** depending on specific requirements of an application.

Although it is disclosed in conjunction with the embodiment of FIG. 1 that the fourth gear 130 and the second shaft 108 form part of the second reduction gearset 124 and the system 104 respectively, the second reduction gearset 124 can be implemented by way of the third gear 128, and the idler gears 132*a*, 132*b* alone. Accordingly, in an embodiment of the present disclosure as depicted in FIG. 3, the second reduction gearset 124 includes the third gear 128 mounted on the first shaft 106, and the idler gears 132*a*, 132*b* mounted on the shaft 134.

Turning back to FIG. 1, the fourth gear 130 and the second shaft 108 can optionally be construed to form part of the engine 102. For example, the fourth gear 130, as shown in FIG. 1, may optionally represent the starting gear, ring gear, or any other turning gear associated with the engine 102 itself, while the second shaft 108, as shown in FIG. 1, may be similarly construed to represent the crankshaft, or the camshaft of the engine 102 on which the starting gear, ring gear, or any other turning gear is disposed. Therefore, the shaft 134 of FIG. 1 can now be regarded as the second shaft 108 of the system 104. However, for purposes of differentiation and hence, clarity in understanding of the present disclosure, reference to the shaft 134 will hereinafter be made as "the second shaft" and designated with the numeral 202. Similarly, reference to the second idler gear 132*b* will be hereinafter made as "the fourth gear" and designated with the numeral 204.

With continued reference to FIG. 1, it can also be contemplated to mesh the third gear 128 directly to the fourth gear 140 thus omitting the use of the shaft 134 (referenced as numeral 202 in FIGS. 2-9). With such a configuration, the diameters of the third gear 128 and the fourth gear 140 may be suitably adjusted to bring them into mesh with each other. Further, it is envisioned that for a given engine and motor generator, the number of gears and number of teeth on the respective gears may be appropriately selected such that the system 104 is configured to synergistically execute the first and second modes of operation therein and achieve the desired torque and/or speed amplifications therefrom. To this end, when constructing the system 104 of the present disclosure, the system configuration may be empirically pre-determined for a given engine and/or motor generator specification and suitably modified to adapt to the configurations of the engine and/or the motor generator. However, a person having ordinary skill in the art will acknowledge that omission of the shaft 134 and the idler gearset 132 from the system 104 can beneficially impart a compact configuration and/or size to the system 104.

Although the foregoing disclosure discloses omission of the idler gearset 132 and the shaft 134 from the system 104 of FIG. 1, it is to be noted that such configurations have been rendered to merely aid the reader's understanding of the present disclosure and the numerous modifications and/or variations possible to the embodiments of the present disclosure. Such exemplary configurations must be taken in the explanatory and illustrative sense only and hence, such exemplary configurations may not create any limitations, particularly as to the description, operation, or use unless specifically set forth in the claims.

Figure 4:
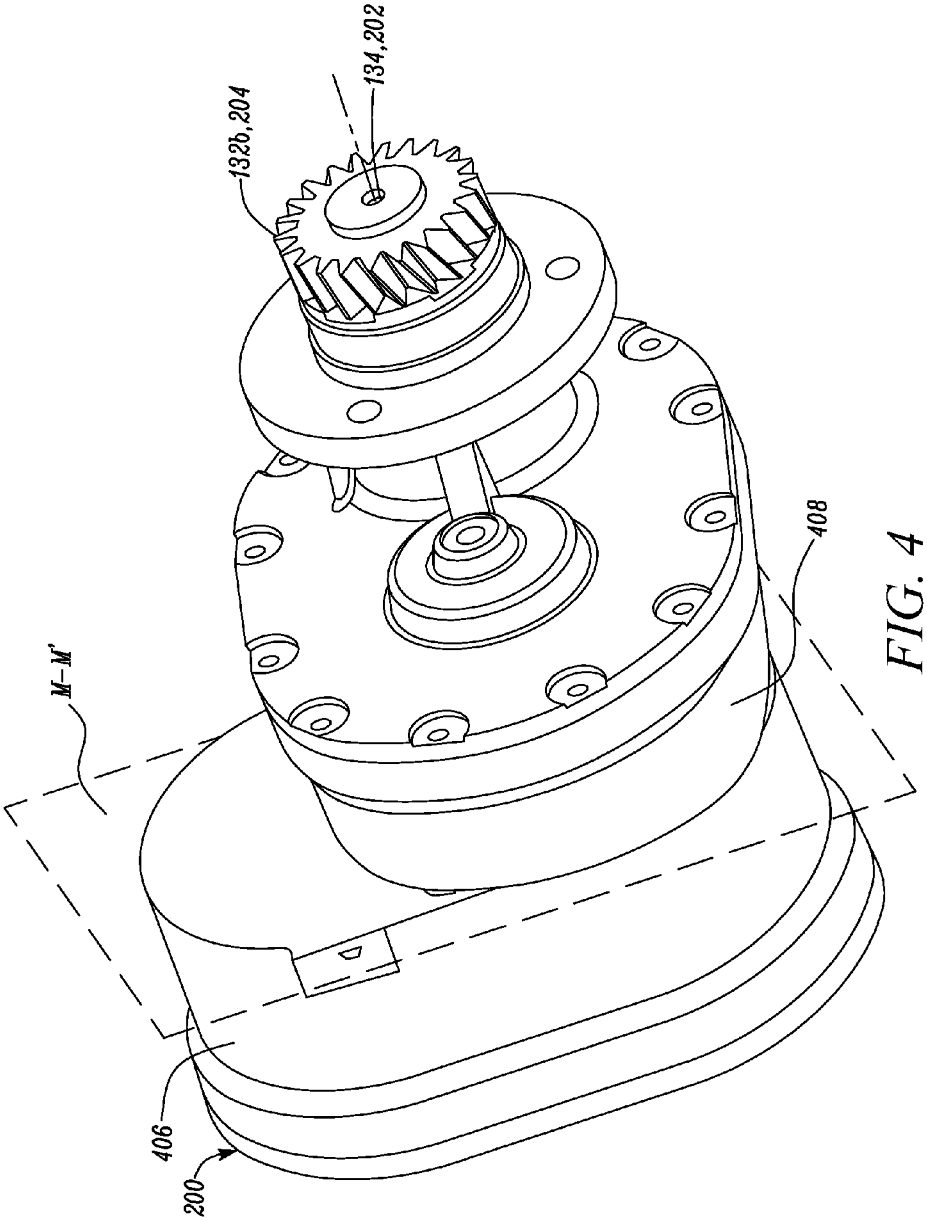
FIG. 4 is an exemplary perspective view of the system in accordance with an another embodiment of the present disclosure.
Figure 5:
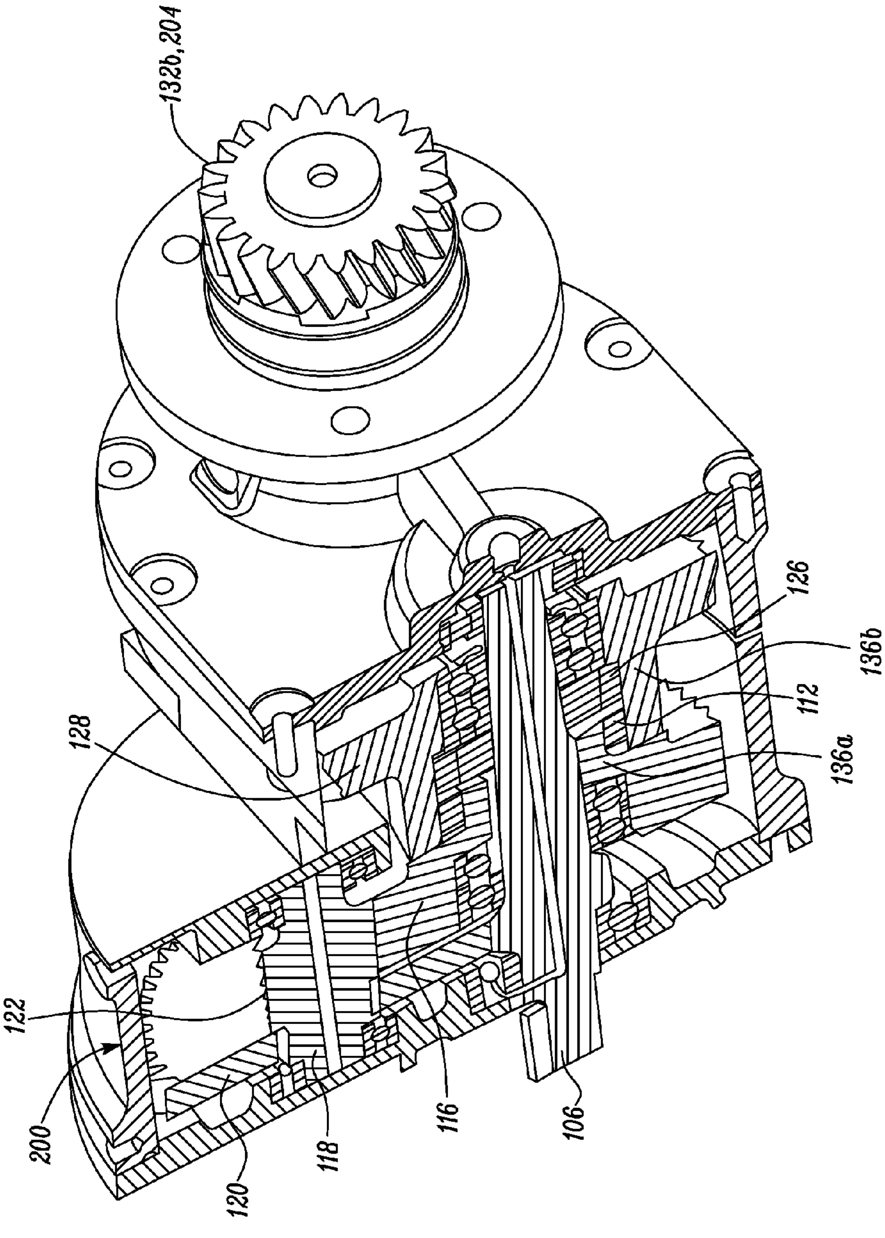
FIG. 5 is a sectional view of the system depicted in FIG. 4.

FIGS. 4 and 5 show another embodiment of the system 104 in a perspective view and a sectional view respectively. The housing 200 can be split along plane M-M' (See FIG. 3). As shown in FIGS. 4-5, the housing 200 may now be represented by a first portion 406 and a second portion 408 where the first portion 406 of the housing 200 is turned 90 degrees relative to a second portion 408 of the housing 200. The first portion 406 of the housing 200 can be configured to accommodate the first shaft 106 and the first reduction gearset 110 while the second portion 408 of the housing 200 can be configured to accommodate the shaft 134 and the second reduction gearset 124. However, in alternative embodiments, the first and second portions 406, 408 can be suitably sized and/or shaped to accommodate, with or without overlap in position, any portion or extent of the shafts and the reduction gearsets. Therefore, a person having ordinary skill in the art that will appreciate that depending on specific requirements of an application and/or other design constraints, various sizes and/or shapes can be suitably used to form the first and second portions 406, 408 such that the housing 200 is configured to accommodate the shafts and the reduction gearsets.

Figure 6:
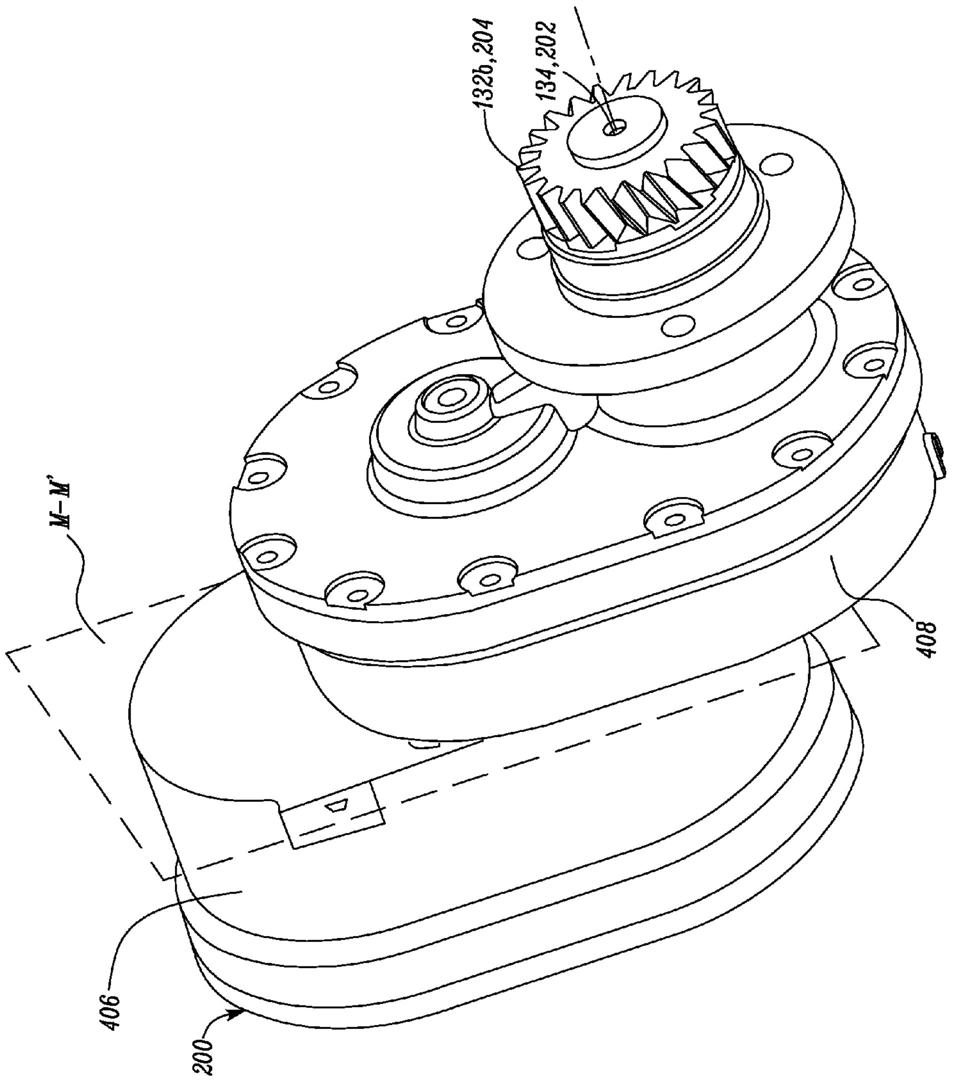
FIG. 6 is an exemplary perspective view of the system in accordance with an another embodiment of the present disclosure.
Figure 7:
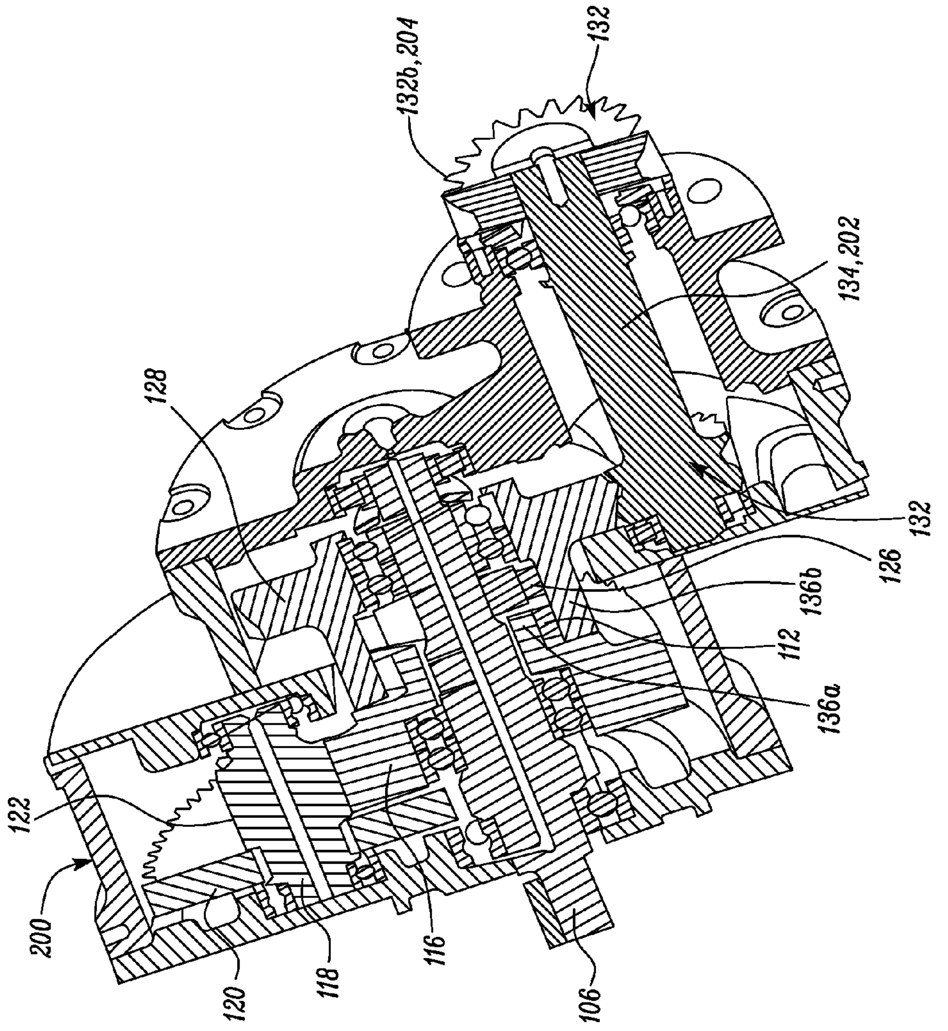
FIG. 7 is a sectional view of the system depicted in FIG. 6.
Figure 8:
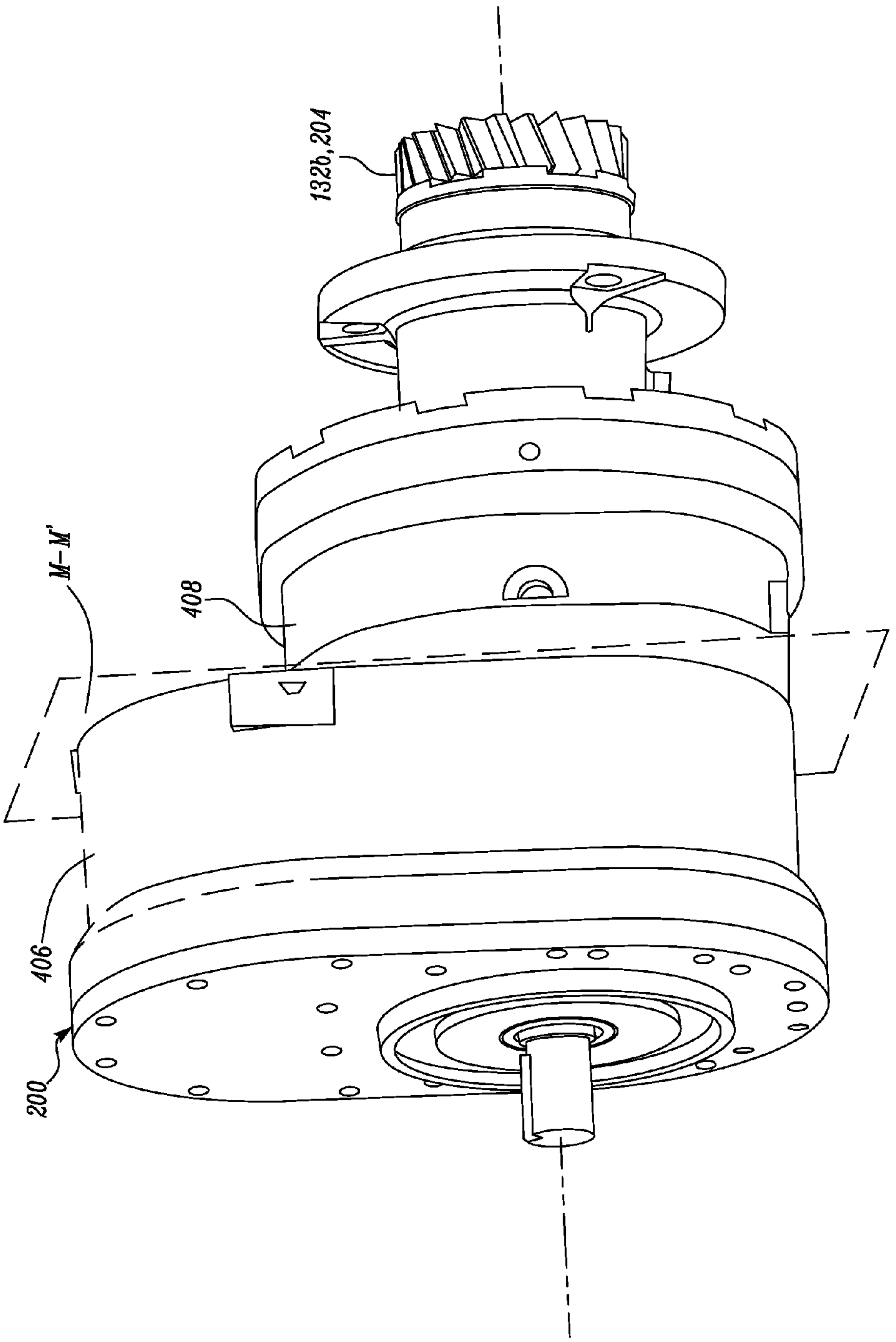
FIG. 8 is an exemplary perspective view of the system in accordance with an another embodiment of the present disclosure.
Figure 9:
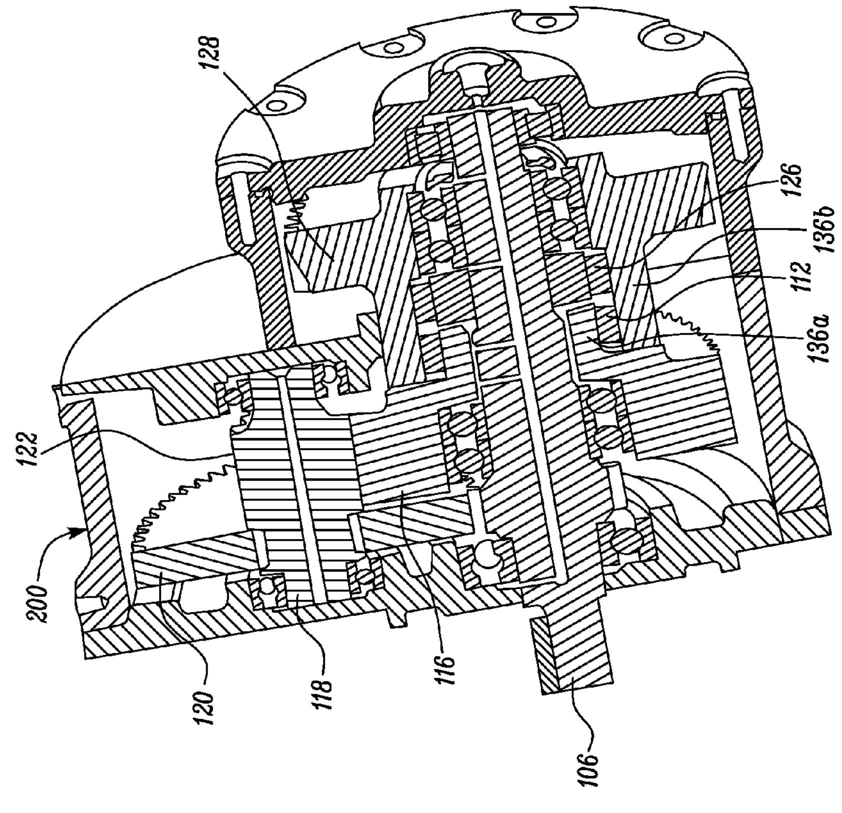
FIG. 9 is a sectional view of the system depicted in FIG. 8.

FIGS. 6 and 7 show yet another embodiment of the system 104 in a perspective view and a sectional view respectively. As shown in FIGS. 6-7, the first portion 406 of the housing 200 and the second portion 408 of the housing 200 are turned 180 degrees relative to each other. Similarly, FIGS. 8 and 9 show yet another embodiment of the system 104 in a perspective view and a sectional view respectively. As shown in FIGS. 8-9, the first portion 406 of the housing 200 and the second portion 408 of the housing 200 are turned 270 degrees relative to each other.

Although, exemplary angular values such as 90 degrees, 180 degrees, 270 degrees have been used to explain and demonstrate the various embodiments of the present disclosure, the angular values disclosed herein are merely exemplary in nature and non-limiting of this disclosure. In other embodiments, the angular value between the first portion 406 and the second portion 408 may change depending on specific requirements of an application. For example, the housing 200 can be constructed with the first portion 406 and the second portion 408 turned 125 degrees or 175 degrees relative to each other.

In a further aspect of the present disclosure, when constructing the housing 200, any direction of rotation can be implemented to the first portion 406 and/or the second portion 408 depending on various requirements of an application. In one embodiment, the housing 200 can be constructed with the second portion 408 turned clockwise to 125 degrees with respect to the first portion 406. In another embodiment, the second portion 408 can be turned counterclockwise to 125 degrees with respect to the first portion 406. Therefore, the first portion 406 and the second portion 408 can be suitably oriented to adapt the housing 200 for fitment and/or installation at a particular location.

INDUSTRIAL APPLICABILITY

Figure 10:
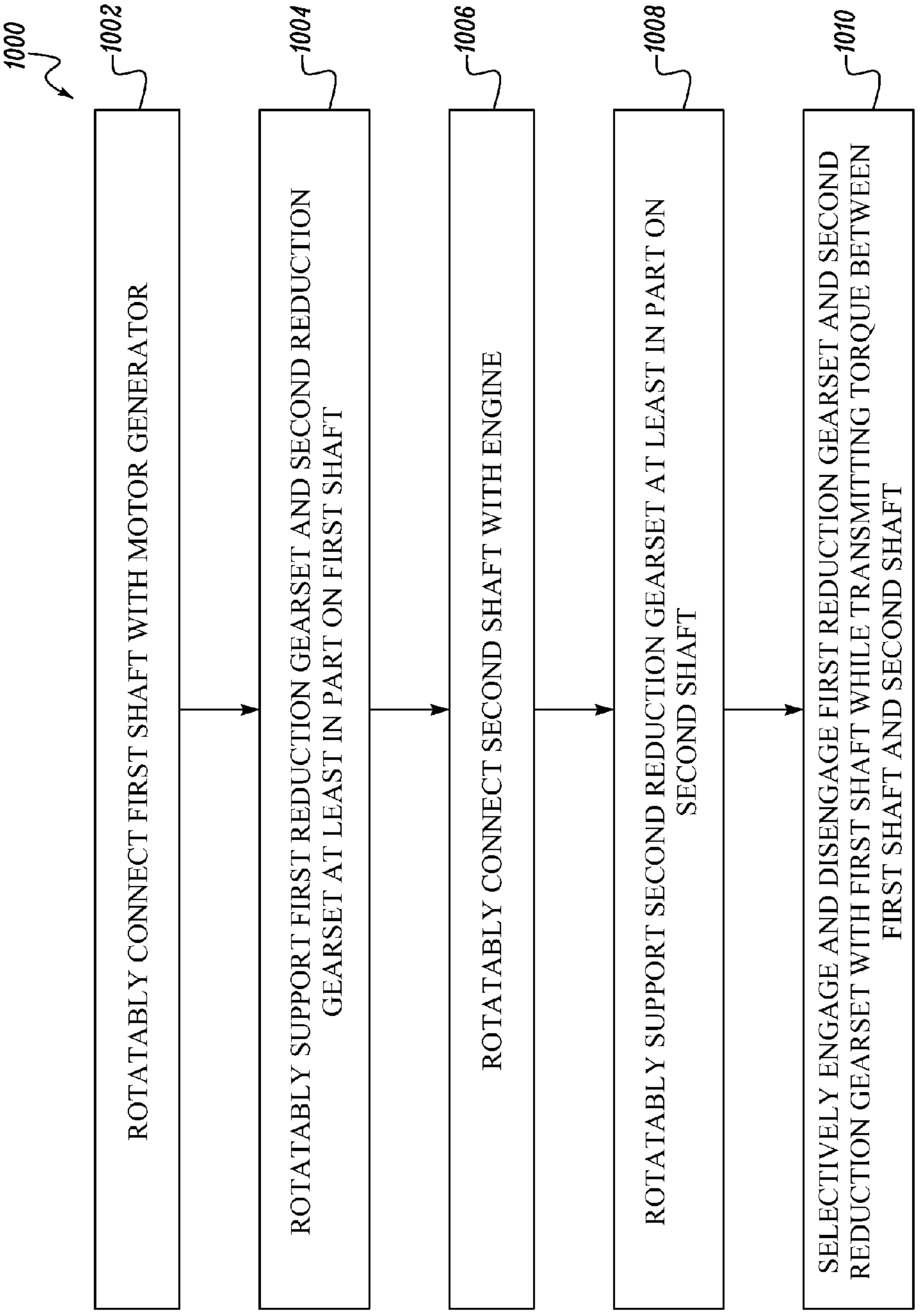
FIG. 10 shows a method of transmitting torque with speed modulation between the exemplary motor generator and engine of FIG. 1.

FIG. 10 shows a method 1000 of transmitting torque with speed modulation between the motor generator 101 and the engine 102. At step 1002, the method 1000 includes rotatably connecting the first shaft 106 with the motor generator 101. At step 1004, the method 1000 further includes rotatably supporting the first reduction gearset 110 and the second reduction gearset 124 at least in part on the first shaft 106. At step 1006, the method 1000 further includes rotatably connecting the second shaft 108 with the engine 102. At step 1008, the method 1000 further includes rotatably supporting the second reduction gearset 124 at least in part on the second shaft 108.

At step 1010, the method 1000 further includes selectively engaging and disengaging the first reduction gearset 110 and the second reduction gearset 124 with the first shaft 106 while transmitting torque between the first shaft 106 and the second shaft 108. In one embodiment, the method 1000 includes engaging the first reduction gearset 110 and disengaging the second reduction gearset 124 such that the first shaft 106 can be operable for transmitting torque to the second shaft 108 via the first and second reduction gearsets 110, 124 in tandem. In another embodiment, the method 1000 includes disengaging the first reduction gearset 110 and engaging the second reduction gearset 124 such that the second shaft 108 can be operable for transmitting torque to the first shaft 106 via the second reduction gearset 124.

Although, some previously known systems modulated torque and/or speed during various operating modes of the engine 102 and the motor generator 101, such previously known systems were less robust in construction and hence, prone to operational fatigue under heavy loads. Such systems when constructed for implementation in heavy-duty applications were expensive and of less reliability in operation. Moreover, the previously known systems were typically bulky and may be cumbersome to install in tight or compact spaces.

With implementation of the present disclosure, the housing 200 disclosed herein can be split into the first portion 406 and the second portion 408. Moreover, during manufacture of the system 104, the first portion 406 can be oriented and fixed in any angular position with respect to the second portion 408 such that the overall housing 200 is adapted to fit within limited spaces that are typically available between the engines and motor generators. Moreover, during manufacture of the system 104, an offset distance between the first shaft 106 and the intermediate shaft 118, the shaft 134, or the second shaft 108 is adjusted, and thereafter, a size of the housing 200 is fixed to accommodate all the components therein. The housing 200 may be rendered in a compact size if the amounts of respective offset distance present between the various shafts 106, 118, 134, and 108 are reduced. Therefore, the present configuration of the housing 200 and/or the system 104, and the flexibility in design thereof allows easy installation of the housing 200 in locations with tight space constraints.

Further, the operation of the present system 104 is effected by the selective engagement and disengagement of the first and second overrunning clutches 112, 126. Therefore, the present system 104 may do away with use of actuating assemblies that were previously installed for use in conjunction with conventional systems. Consequently, the present system 104 can be robust and hence, less prone to operational fatigue under heavy loads. Therefore, the system 104 of the present disclosure may have an improved or prolonged service life as compared to conventionally known systems. Moreover, the present system 104 can be easy and less expensive to manufacture when constructed for heavy-duty applications.

While aspects of the present disclosure have been particularly shown and described with reference to the embodiments above, it will be understood that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A system for transmitting torque with speed modulation between a motor generator and an engine, the system comprising:

- a first shaft configured to rotatably connect with the motor generator;
- a second shaft configured to rotatably connect with the engine;
- a first reduction gearset rotatably supported at least in part on the first shaft, the first reduction gearset disposed in selective engagement with the first shaft via a first overrunning clutch disposed therebetween; and
- a second reduction gearset rotatably supported at least in part on the first shaft and at least in part on the second shaft, the second reduction gearset disposed in selective engagement with the first shaft via a second overrunning clutch disposed therebetween.

2. The system of claim 1, wherein when the first overrunning clutch is engaged and the second overrunning clutch is disengaged; the first shaft is operable to transmit torque to the second shaft via the first and second reduction gearsets in tandem.

3. The system of claim 2, wherein a torque at the second shaft is greater than a torque at the first shaft.

4. The system of claim 1, wherein when the first overrunning clutch is disengaged and the second overrunning clutch is engaged; the second shaft is operable to transmit torque to the first shaft via the second reduction gearset.

5. The system of claim 4, wherein a rotational speed of the first shaft is increased in a range from about 1.1 to 3.5 times.

6. The system of claim 1, wherein the first reduction gearset comprises:

- a first gear rotatably supported on the first shaft;
- a second gear rotatably supported on the first shaft and disposed in selective engagement with the first shaft via the first overrunning clutch;
- an intermediate shaft parallelly offset from the first shaft; and
- a first reduction gear and a second reduction gear rigidly supported on the intermediate shaft, wherein the first reduction gear is disposed in mesh with the first gear, and wherein the second reduction gear is disposed in mesh with the second gear.

7. The system of claim 6, wherein the first gear, the second gear, the first reduction gear, and the second reduction gear are spur gears.

8. The system of claim 1, wherein the second reduction gearset comprises:

- a third gear rotatably supported on the first shaft and disposed in selective engagement with the first shaft via the second overrunning clutch; and
- a fourth gear rigidly supported on the second shaft.

9. The system of claim 8, wherein the second reduction gearset further comprises an idler gear located between the third gear and the fourth gear, the idler gear disposed in mesh with the third gear and the fourth gear.

10. The system of claim 1, wherein the second shaft is disposed in parallel relation to the first shaft.

11. A system for transmitting torque with speed modulation between a motor generator and an engine, the system comprising:

- a first shaft configured to rotatably connect with the motor generator;
- a second shaft configured to rotatably connect with the engine;
- a first reduction gearset rotatably supported at least in part on the first shaft, the first reduction gearset disposed in selective engagement with the first shaft via a first overrunning clutch disposed therebetween;
- a second reduction gearset rotatably supported at least in part on the first shaft and at least in part on the second shaft, the second reduction gearset disposed in selective engagement with the first shaft via a second overrunning clutch disposed therebetween;
- wherein the first overrunning clutch is engaged and the second overrunning clutch is disengaged to transmit torque from the first shaft to the second shaft via the first and second reduction gearsets in tandem; and wherein the first overrunning clutch is disengaged and the second overrunning clutch is engaged to transmit torque from the second shaft to the first shaft via the second reduction gearset.

12. The system of claim 11, wherein a torque at the second shaft is greater than a torque at the first shaft when the first overrunning clutch is engaged and the second overrunning clutch.

13. The system of claim 11, wherein a rotational speed of the first shaft is increased when the first overrunning clutch is disengaged and the second overrunning clutch is engaged.

14. The system of claim 11, wherein the first reduction gearset comprises:

a first gear rotatably supported on the first shaft;

a second gear rotatably supported on the first shaft and disposed in selective engagement with the first shaft;

an intermediate shaft parallelly offset from the first shaft; and a first reduction gear and a second reduction gear rigidly supported on the intermediate shaft, wherein the first reduction gear is disposed in mesh with the first gear, and wherein the second reduction gear is disposed in mesh with the second gear.

15. The system of claim 14, wherein the first gear, the second gear, the first reduction gear, and the second reduction gear are spur gears.

16. The system of claim 11, wherein the second reduction gearset comprises:

a third gear rotatably supported on the first shaft and disposed in selective engagement with the first shaft via the second overrunning clutch; and a fourth gear rigidly supported on the second shaft.

17. The system of claim 16, wherein the second reduction gearset further comprises an idler gear located between and disposed in mesh with the third gear and the fourth gear.

18. The system of claim 11, wherein the second shaft is disposed in parallel relation to the first shaft.

* * * * *